March 6, 1934.  A. DINA  1,949,454

DRIVING MECHANISM FOR MOTION PICTURE PROJECTORS

Filed Dec. 31, 1929    11 Sheets-Sheet 2

Fig. 2.

INVENTOR
Augusto Dina
BY
Howard W. Dix
ATTORNEY

March 6, 1934.  A. DINA  1,949,454

DRIVING MECHANISM FOR MOTION PICTURE PROJECTORS

Filed Dec. 31, 1929  11 Sheets-Sheet 3

Fig. 3.

INVENTOR
Augusto Dina
BY
Howard W. Dix
ATTORNEY

March 6, 1934.  A. DINA  1,949,454
DRIVING MECHANISM FOR MOTION PICTURE PROJECTORS
Filed Dec. 31, 1929  11 Sheets-Sheet 4

Fig. 4.

INVENTOR
Augusto Dina
BY
Howard W. D+
ATTORNEY

March 6, 1934.   A. DINA   1,949,454

DRIVING MECHANISM FOR MOTION PICTURE PROJECTORS

Filed Dec. 31, 1929   11 Sheets-Sheet 5

Fig.5.

INVENTOR
Augusto Dina
BY
Howard W. Dix
ATTORNEY

March 6, 1934.  A. DINA  1,949,454
DRIVING MECHANISM FOR MOTION PICTURE PROJECTORS
Filed Dec. 31, 1929  11 Sheets-Sheet 6

INVENTOR
Augusto Dina
BY
Howard W. Dix
ATTORNEY

March 6, 1934. A. DINA 1,949,454
DRIVING MECHANISM FOR MOTION PICTURE PROJECTORS
Filed Dec. 31, 192​ 11 Sheets-Sheet 7

INVENTOR
Augusto Dina
BY
Howard W. D​
ATTORNEY

March 6, 1934.  A. DINA  1,949,454

DRIVING MECHANISM FOR MOTION PICTURE PROJECTORS

Filed Dec. 31, 1929    11 Sheets-Sheet 10

INVENTOR
Augusto Dina
BY
Howard W. ...
ATTORNEY

Patented Mar. 6, 1934

1,949,454

UNITED STATES PATENT OFFICE 1,949,454

DRIVING MECHANISM FOR MOTION PICTURE PROJECTORS

Augusto Dina, Elizabeth, N. J., assignor to International Projector Corporation, New York, N. Y., a corporation of Delaware Application December 31, 1929, Serial No. 417,634

16 Claims. (Cl. 88—17)

This invention relates to motion picture apparatus and especially to motion picture projectors with particular regard to an improved driving mechanism therefor.

A main object of the invention is to provide an improved, simple, compact, efficient projector driving mechanism which is quiet, light weight, readily adjustable easy to operate and readily oiled and repaired and which operates substantially without vibration and for that reason may be made of much lighter material than has heretofore been deemed desirable.

A further object is to so distribute the driving and driven elements on the machines that the entire assembly is unusually well balanced, giving a center of mass distribution which is approximately at the point of adjustment and support so that the machine may be adjusted on the support with the greatest ease and give the best operative results and eliminate the conditions which multiply, at the point of projection, the vibrations that originate at a remote part of the machine.

A still further object is to provide a complete light weight machine which will efficiently project and which will permit the film to be rewound at high speed without undue loss of power and with a minimum of wear and tear on the film.

Yet another object is to provide a drive mechanism in which the shutter altho directly connected to the drive shaft through an extremely simple gear connection may be associated with a framing mechanism to frame the film without in any way affecting the shutter time and also providing means for separately adjusting the timing of the shutter.

A further object of the invention is to provide a drive in which the driving connector such as a belt needs no tensioning device and in which the connection between the drive shaft and shutter shaft is as direct as possible.

Further and more specific objects, features, and advantages will more clearly appear from the detailed description given below when taken in connection with the accompanying drawings which form part of the specification and which illustrate one present preferred form of the invention.

In the general contemplation of the invention, it is to be observed that the above mentioned objects are practically achieved in the first instance by supporting the entire projection head adjustably around the center of greatest dynamic disturbance which generally is the area immediately adjacent to and including the intermittent motion mechanism, so that the dynamic disturbances created by the moving parts of the drive are reduced to a minimum because their moment arms from the center of support are reduced to a minimum.

In the second instance, the parts are so disposed on the head that the driven elements such as the sprockets and the like are on one side of the head wall, with the film and the film magazines, and the driving and framing mechanisms and similar apparatus are preferably on the other side of the wall which disposition gives a more even balance to the mass of the entire mechanism which enables the frame to be adjustable and to be regulated more easily and also contributes to the lack of vibration thus permitting the reduction in the weight of the parts and the consequent ability to make the machine so light that it can be portable and adaptable for use in homes and the like.

In the third instance, the disposition of the drive shaft and the shutter shaft are so related to the center of support and the center of mass of the entire system and the head that their axes lie as close to these centers as is possible and thus further aid in reducing the ordinarily resultant vibration and center the weight of the parts as close to the axis of support as possible.

In the fourth instance, the invention further contemplates the disposition of the main drive shaft vertically on the frame of the projector and at right angles to the shutter shaft to which it is directly connected. The upper and lower sprockets and the intermittent sprocket and the lower reel are all driven off the one main and preferably vertical shaft to simplify the construction and to reduce the power requirements as much as possible.

In the fifth instance, the invention includes a clutch or connecting member which is disposed between the main power drive gear and the major portion of the driven elements with only the driven shaft of the lower magazine on the other side of the clutch so that when the clutch is opened all the driven elements except this shaft in the lower magazine are disconnected and the film can be rewound right on the machine with the least amount of friction and with the consumption of the smallest possible amount of power.

The present preferred form of the invention is shown in the drawings, in which.

The invention a shown in the drawings is particularly applicable to a motion picture projector in which the projection head frame A is rotatively supported from a pedestal member B mounted on a suitable base member C. The details of this support are fully described and claimed in my co-pending paplication Serial Number 410,829 filed November 30, 1929 and entitled "Motion picture projection machine structure".

Figure 2:
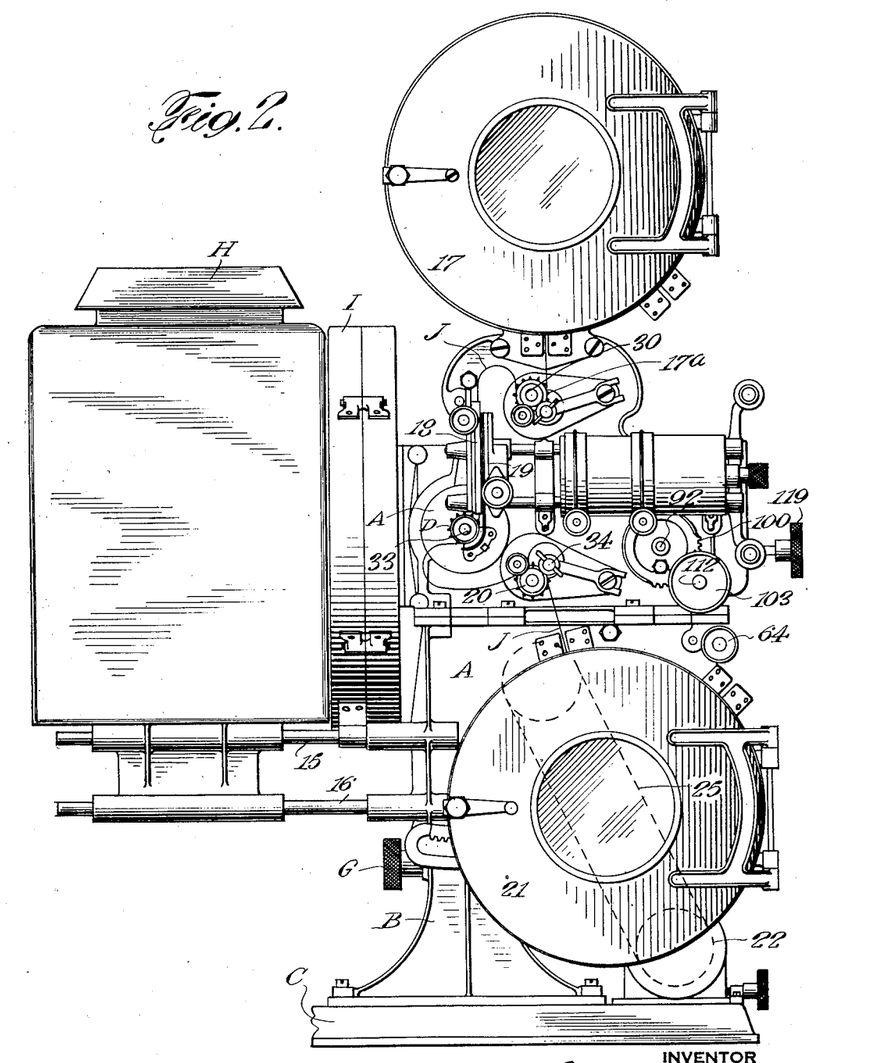
Fig. 2 is a side elevation of the projector from the opposite side thereof.
Figure 3:
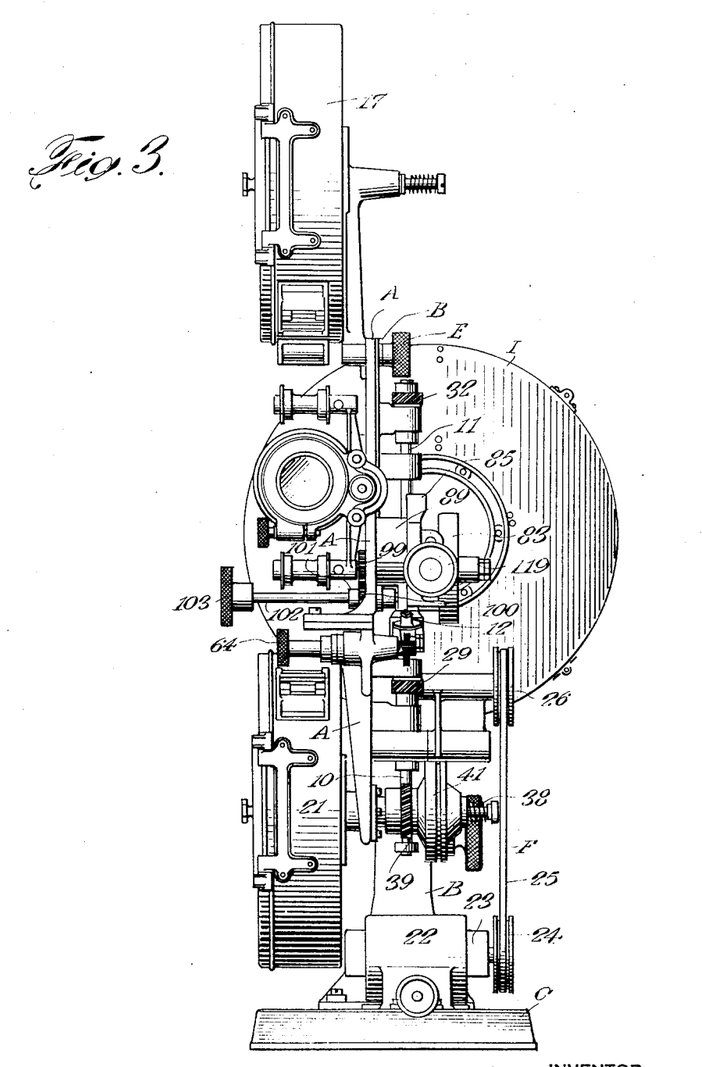
Fig. 3 is a front elevation of the projector.
Figure 4:
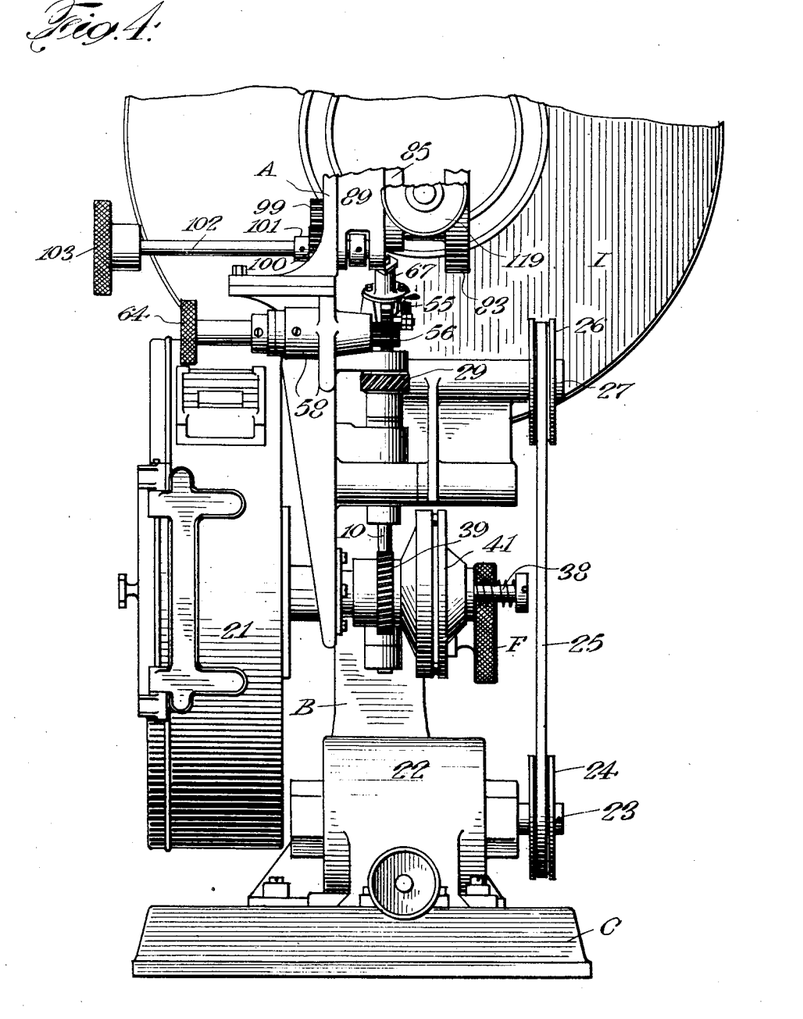
Fig. 4 is an enlarged partial elevation of the front of the projector showing the lower portion thereof.
Figure 5:
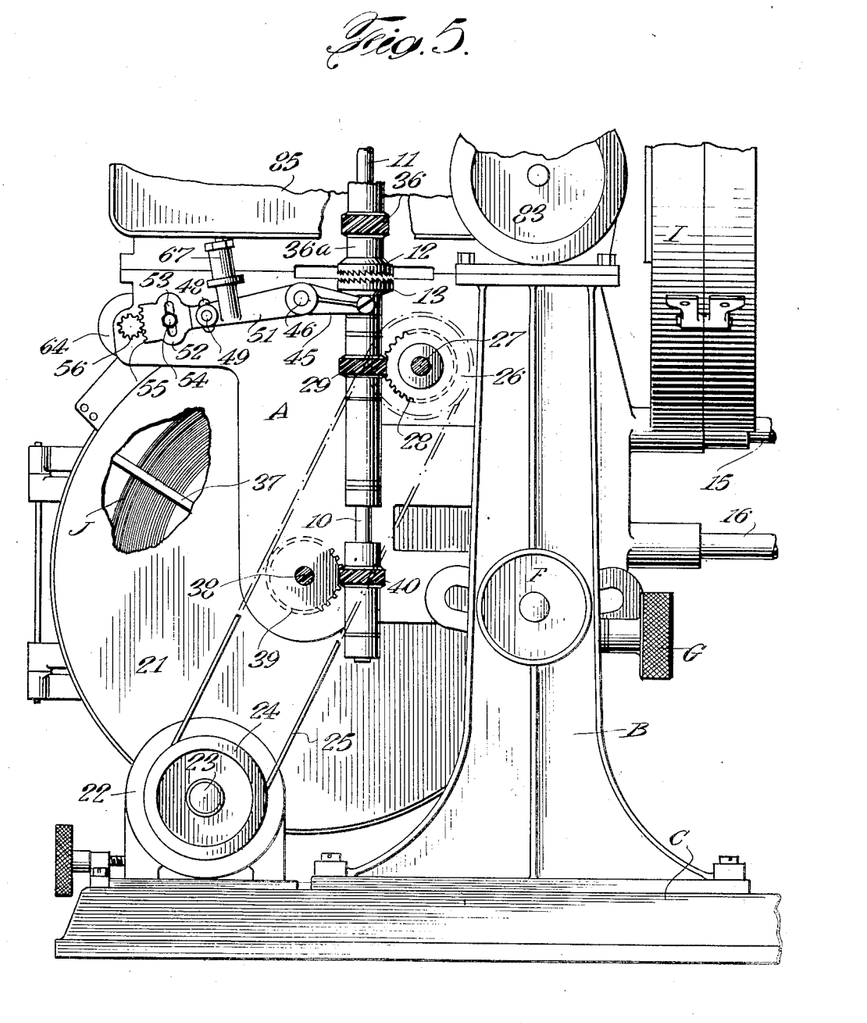
Fig. 5 is an enlarged side elevation of the lower portion of the projector showing the lower drive shaft, a clutch and the lower magazine.

The main point with respect to the supporting of frame A which is of interest in this application is that the axis of rotation for the adjustment of this frame A is disposed preferably in alinement with or at least in the immediate vicinity of the axis of the intermittent sprocket D shown in Fig. 2. The frame is held in adjusted positions by means of suitable clamping knobs E and F at widely different points to give great holding strength with small sized elements. The frame A may be adjusted as by oscillating when these two knobs are released, by means of knob G in a manner shown more in detail in the above mentioned co-pending application.

The main drive of the projector preferably involves the disposition on the frame A of a main drive shaft preferably disposed vertically on one side of the frame A and midway thereof and comprising alined separate portions 10 and 11 connected by clutch members 12 and 13. This shaft co-operates with a shutter shaft 14 which is disposed usually at right angles thereto. It will be noticed that the axes of these two shafts are disposed in lines which run close to the axis of the intermittent sprocket D to reduce as much as possible the moment arms of any vibratory forces set up by the motion of the mechanism activated by the movement of these shafts.

It will also be noticed that the lamp house H and the shutter guard casing I are disposed on the side of the supporting center, namely the axis of the intermittent sprocket D, opposite to that on which the rest of the mechanism is supported. This condition assists to balance the total load around this supporting axis and make the movement and adjustment of the parts much easier than ordinarily. The lamp house H is supported from the frame A on rods such as 15 and 16 and is adjustable therealong.

Referring to the drawings, Fig. 2 shows the usual path of the film J during projection and this extends from the upper film magazine 17 down around the upper film sprocket 17a then between the gate 18 and door 19, around the intermittent sprocket D, thence around the lower film sprocket 20 and then into the lower film magazine 21.

Figure 1:
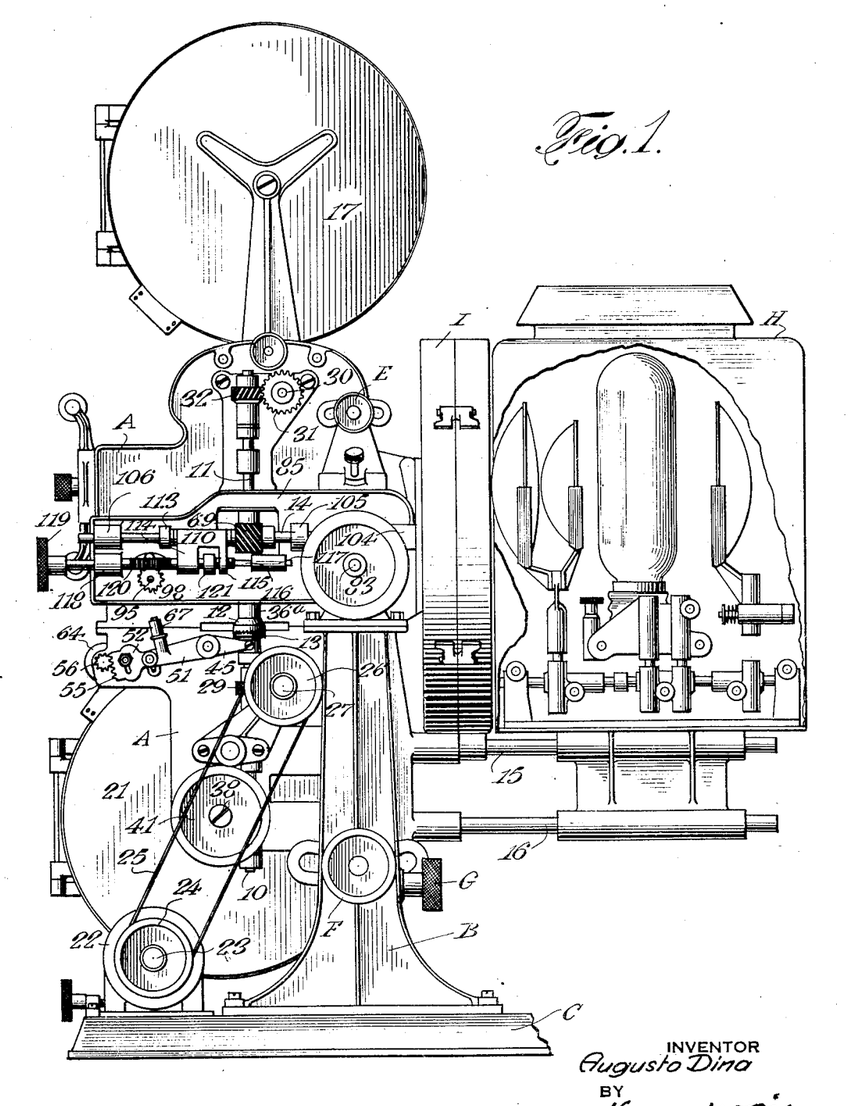
Fig. 1 is a side elevation of the projector from the side on which is disposed the drive shaft.

The preferred form of the power drive as shown in the drawings comprises an electric motor 22 the shaft 23 of which carries a pulley 24. Over this pulley 24 extends a belt 25 with the extended part passing over a drive pulley 26 on a shaft 27 journalled in the frame A. The other end of the shaft 27 carries a gear 28 meshing with a gear 29 on the lower portion 10 of the main drive shaft. From a consideration of Fig. 1 it will be seen that the axes of the motor 22, the shaft 27 and the axis of the intermittent sprocket D are in line and therefore when it is desired to adjust the frame A somewhat from the position shown in Fig. 1, the movement of the pulley 26 around the axis of the support of the frame A and the movement of the belt around the axis of the motor shaft 23 will for a sufficient distance be along a common tangent so that the pulley will not be moved far enough away from the motor axis to unduly stretch the belt 25 and it has not been found necessary to provide a tensioning device for the belt 25. It will be noted that the motor may be moved on its base to make proper adjustments in the belt if desired.

The main drive is intended to be as simple as possible and to make as direct a connection with the driven elements as is possible to avoid loss of power and to keep the friction at a minimum. To this end it will be noticed that the shaft 30 of the upper film sprocket 17a carries a gear 31 driven directly by a gear 32 on the upper portion 11 of the main vertically disposed drive shaft. The intermittent sprocket D is on a shaft 33 which is operated from the shutter shaft 14 by mechanism to be described later in detail with regard to the framing mechanism. The lower film sprocket 20 is on a shaft 34 carrying a gear 35 meshing directly with a gear 36 on the upper portion 11 of the main drive shaft. This gear is on a shaft or sleeve 36a keyed to shaft 11 and also carries upper clutch member 12. The lower magazine 21 contains the reel 37 mounted on a shaft 38 carrying a gear 39 meshing directly with a gear 40 on the lower portion 10 of the main drive shaft. A friction clutch 41 of any suitable type may be interposed between the gear 39 and the shaft 38 to permit slip as is usual, and to prevent breaking of the film as it is being wound up on the reel 37. Other types of film take-up devices may be employed if desired.

As referred to above, the main drive shaft is split into two alined portions 10 and 11 which are connected by clutch members or faces 12 and 13. The purpose of this clutch is to provide quick and simple means whereby power to the driven elements above the clutch device may be easily cut-off when the film is to be rewound and requiring merely a small movement of the operator's fingers to open or close the clutch.

Figure 6:
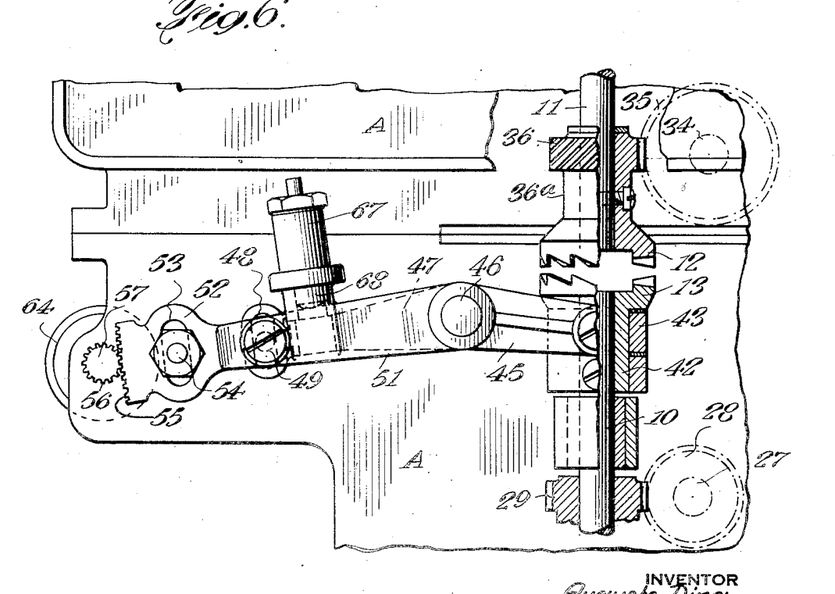
Fig. 6 is an enlarged side elevation partly in section of the clutch mechanism.
Figure 7:
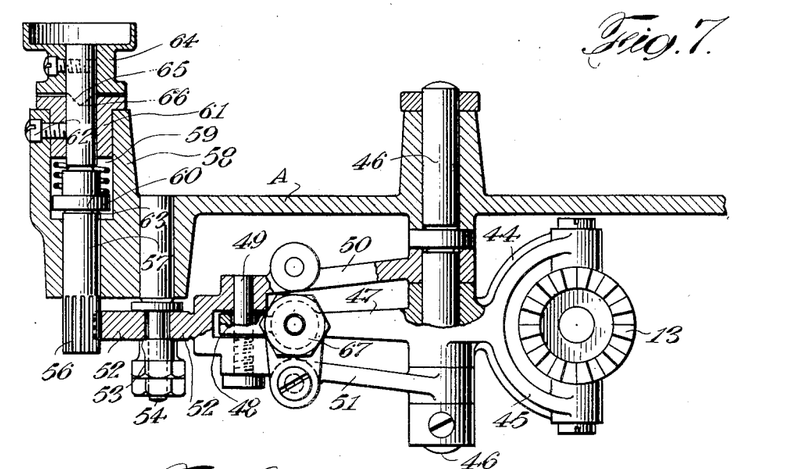
Fig. 7 is a horizontal section through the clutch mechanism.

Furthermore, it is intended to provide means whereby the clutch device can be locked in its open and closed positions, and to insure that when it is locked in its closed position, the clutch faces will automatically be engaged even tho when first drawn together they are not in power engaging relation as is sometimes the case especially with gear faced clutch members. To this end a preferred form of clutch mechanism is shown in the drawings and comprises the faces 12 and 13 with the usual engaging teeth. The lower face or member 13 is mounted on a sleeve 42 around which is disposed a collar 43 receiving the yoke ends 44 and 45 of an arm pivotally mounted on shaft 46 journalled in frame A, the other end of said arm 47 being slotted as at 48 to receive pin 49. Also journalled on the shaft 46 are the ends of arms 50 and 51 which at their other ends are joined as a single arm 52. The pin 49 extends between the arms 50 and 51. The arm 52 is slotted as at 53 to receive a pin 54 fastened to the frame A. The outer end of the arm 52 has teeth 55 meshing with gear 56 on the end of shaft 57. This shaft is disposed in an enlarged housing 58 on the frame A which has a chamber 59 in which slides a flange 60 on the shaft 57. The end of the chamber 59 is closed by a plug 61 held thereto by a screw 62. Between the end of the plug 61 and the flange 60 is disposed a spring 63 which tends to press downward always on the flange 60. The end of the shaft 57 extends through the plug 61 and has thereon a hand knob 64 keyed thereto. The inner face of the hand knob is provided with a tongue 65 which when in proper position is adapted to enter a groove 66 in the adjacent face of the plug 61. When the tongue 65 and the groove 66 are engaged in one position the arm 52 is at one extreme end of its travel, and when they are in the other engaged position the said arm is at the other extreme end of its travel. The parts are so designed that when these positions are reached by the arm 52 the pin 54 will have reached the end of the slot 53 therein. This mechanism affords a ready and effective device whereby the clutch can be locked either open or closed.

Straddled across on top of the arms 50 and 51 is a casing 67 within which is a piston 68 urged always downwardly by a spring (not shown) to bear on the top of the arm 47. This will form a cushion between the arms 50, 51 and the arm 47 and yet will permit them to be moved together around the pivot shaft 46. The limit of relative movement of the arm 47 is defined by the engagement of the ends of the slot 48 and the pin 49. When the knob 64 is operated to turn the arms 50 and 51 counter clock-wise around the shaft 46 this knob can be completely turned to locking position and this moves the clutch member 13 upwardly toward the clutch member 12. But if when they meet the teeth thereon or the adjacent faces with or without teeth are not properly related to transmit power therebetween, then the spring cushion within the casing will exert an upward force on the lower clutch member so that as soon as the faces are relatively disposed to properly transmit power the lower face 13 will be snapped quickly up into proper engagement with the upper member 12. Thus the clutch operating element can be locked in position even when the clutch faces are not completely and properly engaged for power transmission and the automatic spring operated connection will take care of the proper and instantaneous engagement when the proper alinement is effected. The details of this clutch operating device are shown, described, and claimed in my Patent No. 1,869,887 entitled "Clutch and operating mechanism therefor".

With regard to the shutter operating and framing mechanism which forms part of the driving mechanism of the improved machine, it is to be noted that the connection between the shutter and the framing mechanism and the power shaft is as simple as it can possibly be and that the shutter and the intermittent sprocket are connected by a framing mechanism which will permit the film J to be framed or moved without affecting the timing of the shutter to any effective extent. This action may be accomplished while the machine is running. In general the framing device-shutter relation is such that by merely turning a knob the operator may turn the intermittent sprocket on its own axis without disturbing the cyclical relations which exist between the shutter and the other parts of the intermittent mechanism so that altho the film is framed the shutter timing is undisturbed so that no extra and additional adjustment thereof is necessary.

Separate means is provided for adjusting the shutter at will and preferably while the machine in in full operation. The framing mechanism and the shutter shaft are disposed to lie as dynamically close to the axis of the intermittent sprocket as possible and thus reduce the vibration losses as much as is consistent with the mechanical and design requirements of the machine.

To this end the preferred form of the framing and shutter operating mechanism shown in the drawings comprises a shutter drive shaft 14 carrying a worm gear 69 meshing with a worm gear 70 on the upper portion 11 of the main drive shaft. The shutter shaft extends horizontally across the frame A and at its right hand end supports the shutter (not shown) which is disposed within the shutter guard casing I, and is positioned between the lamp house H and the frame A. The pedestal member B near its top is provided with a large circular journal member 71 within which is received a large similarly shaped cup-shaped bearing member 72 from the frame A. This portion of the frame A has the journal sleeve 73 for the shaft 74 having on its outer end the intermittent sprocket D the inner end of the shaft having the usual star wheel 75 engaging with the usual cam 76 and pin wheel 77 mounted on a shaft 78 journalled on one end in the sleeve 79 formed on the frame A and throughout the remainder of its length is rotatably chambered in casing 80 disposed within the cup-shaped bearing member 72.

On the other end of the shaft 78 is disposed a sleeve 81 carrying a gear 82 and a fly wheel 83 keyed thereto. Also around the shaft 78 is disposed an integral sleeve 84 extending from the chambered casing 80. Extending across the open face of the journal 71 and the bearing member 72 is a plate 85. This plate is adapted to be moved in a slidable arcuate manner to be hereinafter described. It has a journal sleeve 86 surrounding the sleeve 84 above mentioned and is connected to the chambered casing 80 by means of the stub shaft 87 extending through a curved arcuate slot 88 in the plate 85 which permits the casing 80 to be rotated within the bearing member 72 around the axis of the shaft 74 while permitting the plate to have a predetermined sliding movement.

Figure 9:
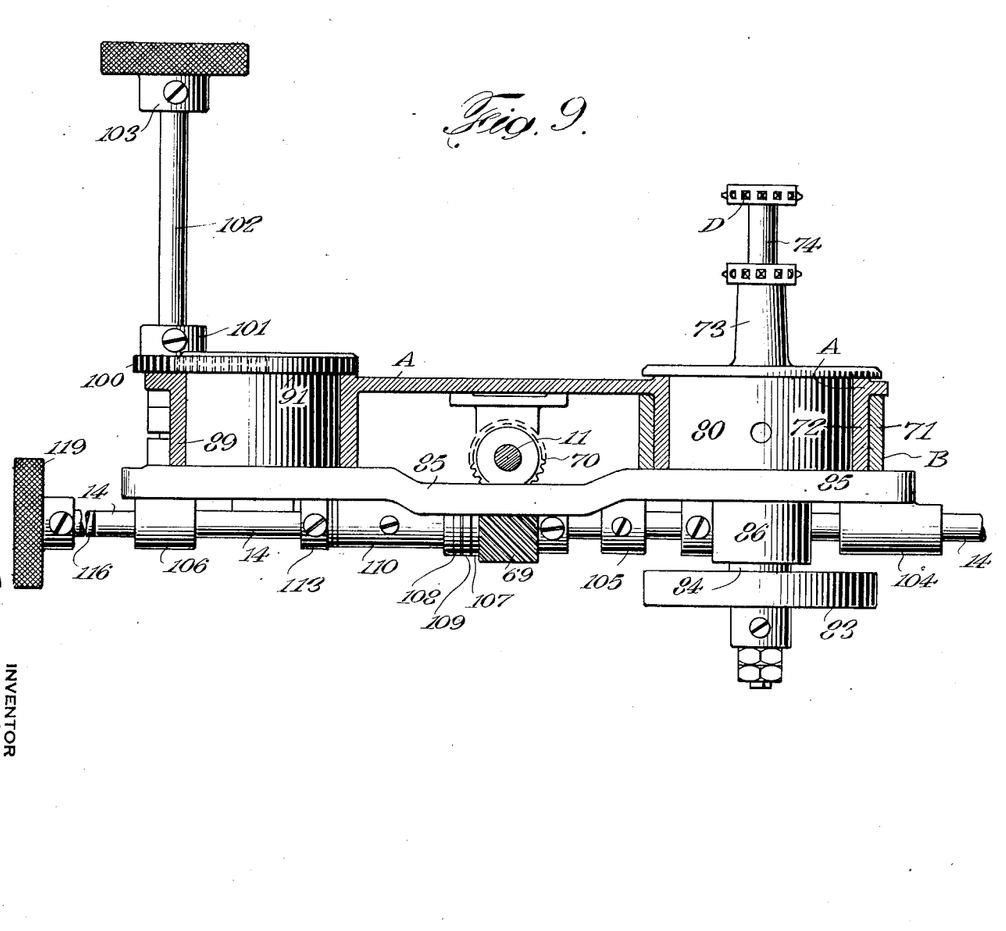
Fig. 9 is a plan view of the framing mechanism.
Figure 12:
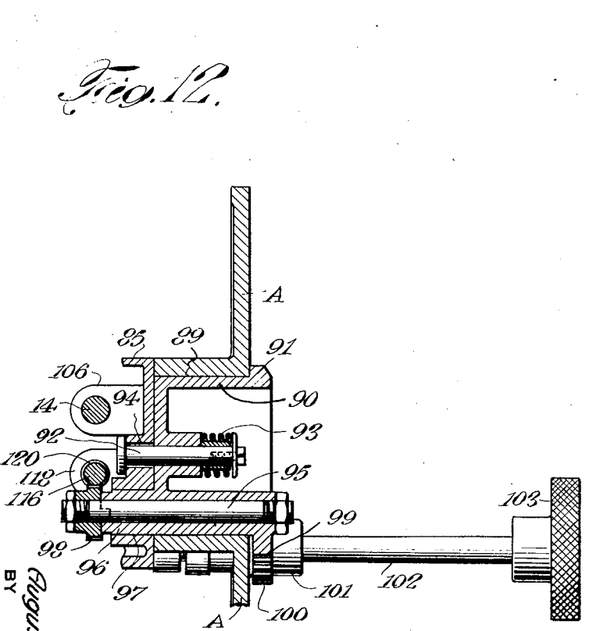
Fig. 12 is a similar section taken on the line 12—12 of Fig. 8.

The plate 85 extends across the face of another circular journal member 89 (see Figs. 9 and 12) and in this member 89 is rotatably disposed a casing 90 having a flange 91 at one end and connected to the plate 85 at the other face by means of the flanged stub shaft 92 which on one end is engaged by a spring 93 as shown to hold the plate 85 firmly against the face of the member 90. The plate has an arcuate slot 94 therein adaptable for the same purpose as the slot above mentioned in the plate 85 before the casing 80. The casing 90 acts as a journal for the shaft 95 which is fixed within a sleeve-like opening 97 in the plate 85 and has a gear 98 thereon.

Figure 8:
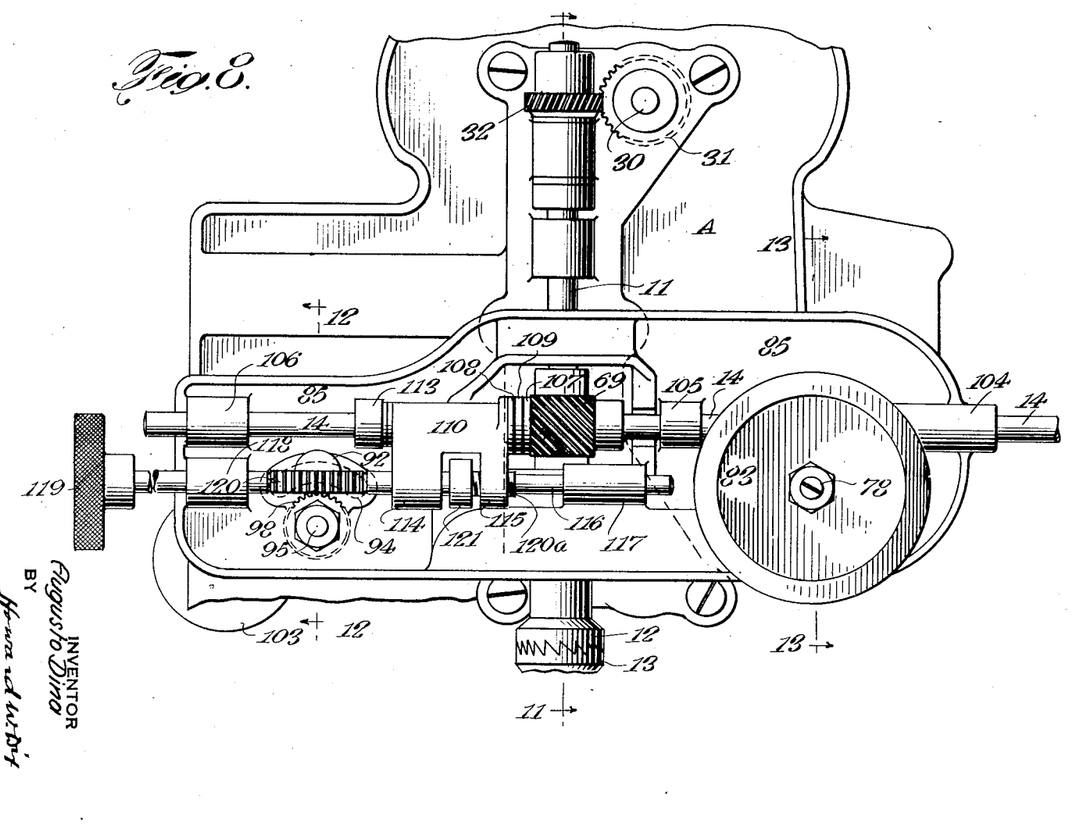
Fig. 8 is an enlarged side elevation of the framing mechanism.
Figure 10:
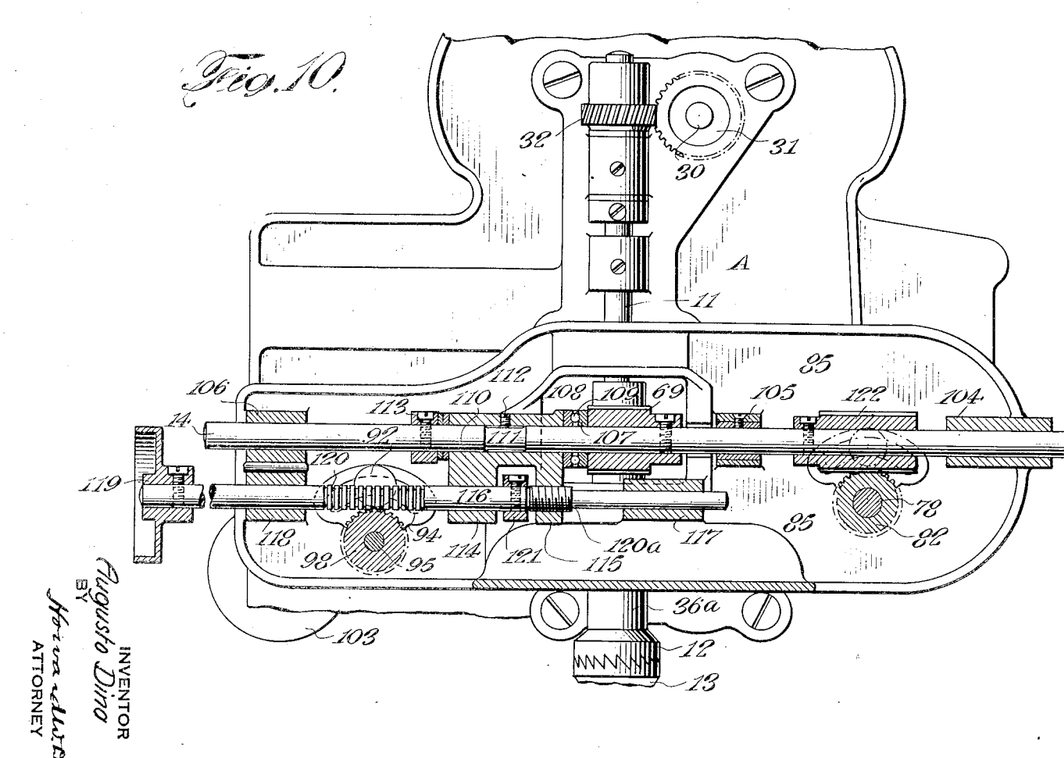
Fig. 10 is a vertical longitudinal section taken through the framing mechanism.
Figure 11:
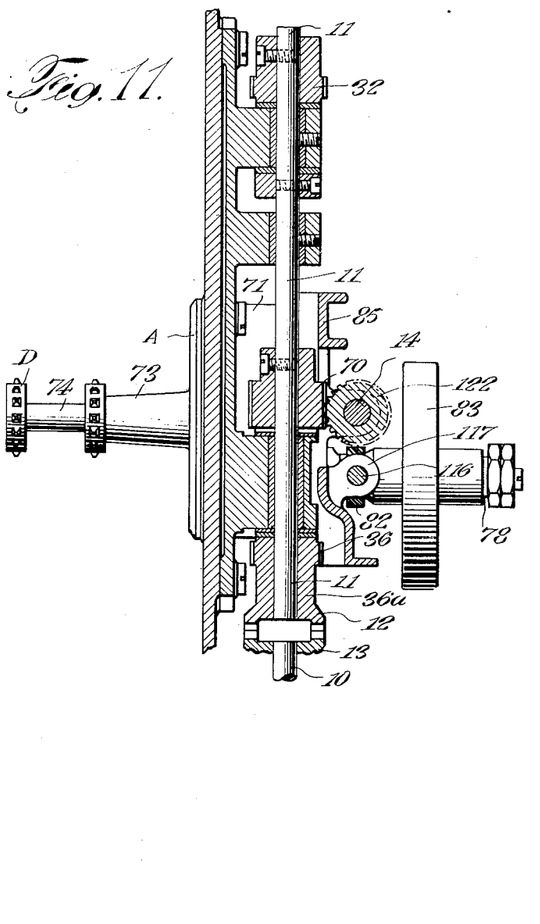
Fig. 11 is a transverse vertical section on the line 11—11 of Fig. 8.

The lower face of the flange 91 on the casing 90 is provided with teeth 99 thereon meshing with teeth 100 on a hub 101 on a shaft 102 which in turn is journalled in the frame A. At the other end of shaft 102 there is a hand knob 103 whereby this shaft 102 may be turned to oscillate the casing 90 around the axis of the stub shaft 92. As will be seen in Fig. 8 the shaft 14 for the shutter is supported in journals 104, 105, 106 disposed on the face of the plate 85. The worm 69 is fastened to this shaft 14 (see Fig. 10). To the left of the gear 69 are disposed spaced collars 107 and 108 between which are preferably disposed ball bearings 109. Adjacent the collars 107 and 108 is a yoke member 110 having an upper bore through which the shaft 14 extends. The shaft therein is reduced in diameter as at 111 and into this space extends a set screw 112 so that the shaft 14 may turn in the yoke but its longitudinal movement relative thereto is limited. On the other side of the yoke 110 is disposed a fixed collar 113 fastened to the shaft 14.

Figure 13:
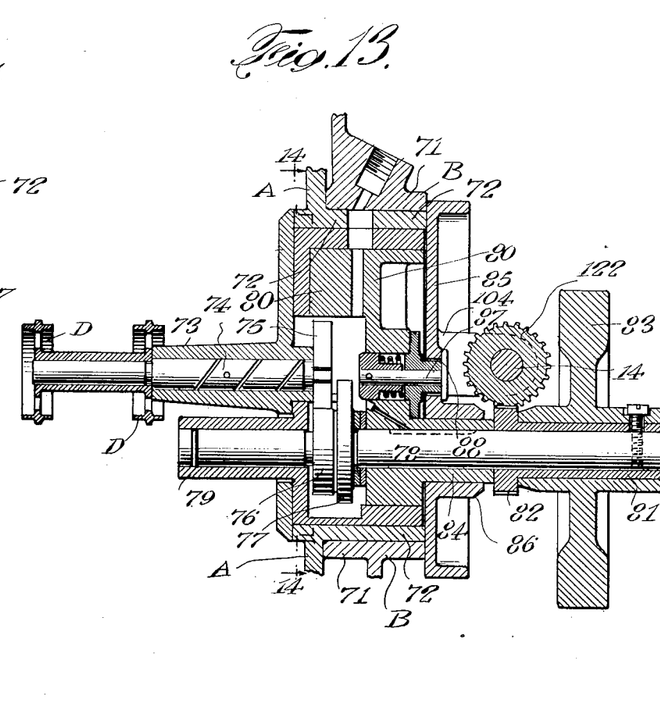
Fig. 13 is a vertical transverse section taken on the line 13—13 of Fig. 8; and, Fig. 14 is a vertical longitudinal section taken on the line 14—14 of Fig. 13.
Figure 14:
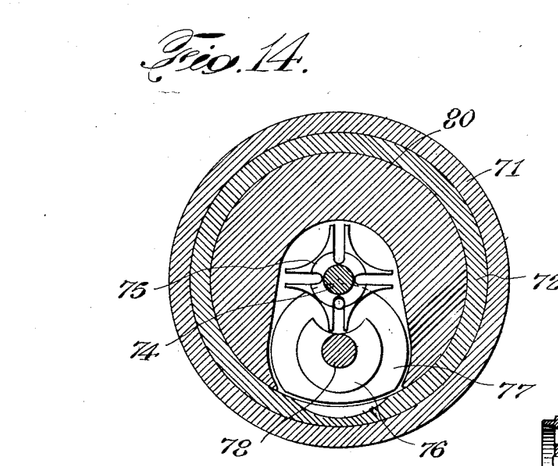

The lower portion of the yoke member 110 is formed as two spaced wings 114 and 115 having bores through which extends a control shaft 116. Thus shaft 116 is supported in journals 117, and 118 on the plate 85 and has at its end a control knob 119. The shaft 116 has a straight rack 120 thereon meshing with the gear 98 above mentioned. It also has a threaded portion 120a threadably engaged with a bore in the wing 115. Between the wings 114 and 115 there is fastened to the shaft 116 a collar 121 which limits the amount to which the shaft may be moved relatively to the yoke member 110. Over the gear 82 (see Figs. 10 and 13) there is disposed and meshing therewith a gear 122 fixed on the shaft 14.

In framing, by turning the handle 103 the casing 90 is rotated and thus moves the plate in an arcuate path. This thus turns the casing 80 which turns the pin wheel shaft and frames the sprocket D while the shutter shaft is practically unaffected because of the control on it exerted by the control shaft 116 which so controls its movement that it will move practically nil longitudinally and will have substantially no turning altho it may move up and down as a whole.

The detailed description and construction of the above mentioned framing device is described shown and claimed in my co-pending application Serial Number 465,349, filed July 2, 1930, entitled "Improvements in framing mechanisms for motion picture machines".

In generally describing the operation of the entire machine, it will be apparent that when the motor 22 is started, the belt transmits motion to the pulley 26 and shaft 27 which turns gear 28 and thus the gear 29 on the lower portion 10 of the main drive shaft. Before the motor 22 is started the clutch members 12 and 13 should be engaged, unless rewinding is taking place, and this engagement drives the upper portion 11 of the main drive shaft. The lower gear 40 on the shaft 10 is turned and with it the gear 39 and the shaft 38 whereby the lower reel 37 is turned to actuate the film J and keep it taut. The clutch operating handle 64 can be turned all the way around to locking position and the automatic action of the spring above mentioned will snap the clutch members together if they do not happen to be properly alined when they first engage. When the mechanism is to be operated to rewind only, then the clutch handle 64 is thrown in the opposite direction until the tongue and groove above mentioned lock again. When this happens the clutch is entirely disengaged and the motor 22 drive will only actuate the lower shaft 10 and the drive gear 29 and the lower reel gear 40.

When the clutch is in and the motor 22 started the lower sprocket gear 36, the upper sprocket gear 32, and the shutter drive gear 70 are all actuated. Thus the film J is fed through the machine positively and the shutter is directly driven from the main drive shaft 11. If the frame A is to be adjusted to aline the projection with the screen properly, apart from the usual framing, the same can be accomplished by loosening the clamps E and F and actuating the adjusting member G. The details of this construction whereby the frame may be adjusted and considered merely as a mechanical movement is shown and described and claimed in my Patent No. 1,869,888, entitled "Adjusting and clamping mechanism for motion picture machine parts".

When the above adjustment takes place it will be noted that the pulley 26 will travel along the tangent common to the two circles of which the motor drive shaft is one center and the axis of the support is the other center so that the belt will undergo a minimum of change in its tension and the need for a separate tensioning device is avoided.

To frame the picture it is merely necessary to turn the handle 103 which will cause the rotation of the casing 90 and this motion will be transmitted through the plate 85 to the casing 80 the rotation of which will cause the rotation of the pin wheel shaft 78 around the axis of the star wheel shaft 74 and cause the framing of the film J without any effective change of the operation of the shutter or its relative timing with regard to the film J. This framing can also be done while the film J is running. It will be seen that there is no relative change between the pin wheel and the star wheel of the intermittent apparatus. To change the shutter position it is merely necessary to turn the handle 119 which will rotate the shaft 116 which through the yoke member 110 will move the shutter shaft 14 longitudinally and cause the worm 122 to roll over the gear 82 and slightly turn to oscillate the shutter the desired amount. This action also may be effected while the machine is running.

It will be noticed that practically all the driving mechanism is on one side of the frame A and that practically all the driven members are on the other side of the frame A. Those devices therefore which most need oiling such as the driving members are separated from those which come in contact with the film J by the wall of the frame A. Also the weight of the parts is thus more evenly balanced and the ability to adjust the mechanism around the support is made easier and more accurate. It will also be noted that the axes of the main drive shafts 10 and 11 and the axis of the shutter shaft 14 are at right angles to each other and are located unusually close to the center of the intermittent mechanism. This center being the axis of the support of the whole mechanism, the disturbing forces causing vibration set up usually by the movements of the drive of the parts are reduced to a minimum by the fact that their moment arms from the axis of support are reduced as much as possible.

Thus there is provided a simple compact and efficient driving mechanism for a motion picture projector which is capable of ready and easy adjustment, is well balanced with respect to both the longitudinal and transverse vertical planes through the machine, and is so designed that the moving parts produce a minimum of friction and vibration and can therefore be made relatively light weight so that it can be readily used in the home and be portable for ready use anywhere. The adjustments whether the machine is running or not are simple and quickly made and from such positions that the operator can effect them with ease and dispatch and without requiring much movement and room on his part.

In summation, the direct drive from one main drive shaft to the various elements reduces the number of parts, the vertical and right angular relation of the main and the shutter shaft tends to balance opposing vibration forces therein and neutralize them, the disposition of these shafts close to the support center reduces the effect of the forces on the stability of the frame, and adjustments such as shutter control and film framing can be made with utmost ease and dispatch while the film is running and the minimum of power can be employed at all times with low friction losses and quiet operation and especially high speed rewinding of the film with minimum wear and tear thereon.

The detail description and operation of the other parts of this mechanism shown and described but not claimed herein are shown and is disclosed in my Patent No. 1,857,116, entitled "Pad roller mounting".

While the invention has been described in detail and with respect to a present preferred form thereof, it is not to be limited to such details and forms since many changes and modifications may be made and the invention embodied in other forms and modifications without departing from the spirit and scope of the invention in its broadest aspects. Hence it is desired to cover any and all forms and modifications coming within the language and scope of any one or more of the appended claims.

What is claimed, is,

1. In a motion picture projector, a support, a head frame, intermittent mechanism on said frame, said mechanism journalled on the support to permit the frame to be pivotally adjusted on the support around said mechanism, a driving motor, a main drive pulley on the frame and connected to the motor, the supports for the frame and for the motor and for the drive pulley being positioned substantially in a straight line.

2. In a motion picture projector, a support, a head frame, an intermittent mechanism on said frame, and means for journalling said mechanism in the support to permit the pivotal adjustment of the frame relative to the support, a driving motor, a main drive pulley on the frame and connected to the motor, the drive pulley lying between the axis of the support and the axis of the motor, the supports for the frame and for the motor and for the pulley being substantially in a straight line.

3. In a motion picture projector, a support, a head frame, an intermittent mechanism on the frame, means for journalling said mechanism in the support to permit the pivotal adjustment of the frame relative to the support around said mechanism, a drive shaft disposed midway of one side of the frame with its axis as close as possible to the axis of the intermittent mechanism, a shutter shaft at right angles to the main drive shaft with its axis as close as possible to the axis of the intermittent mechanism, the shutter shaft being drivingly connected directly to the main drive shaft.

4. In a driving mechanism for motion picture projectors having a support and a head frame pivotally supported therein around the axis of the intermittent mechanism, a drive shaft disposed on the frame with its axis close to that of the intermittent mechanism, means for driving said drive shaft, a clutch device disposed intermediate the drive shaft, a main drive gear and a lower magazine drive gear disposed on one side of the clutch device, and an upper magazine drive gear, lower and upper sprocket drive gears, and a shutter drive gear disposed on the other side of the clutch device on said main drive shaft.

5. In a driving mechanism for motion picture projectors having a support and a head frame pivotally supported therein around the axis of the intermittent mechanism, a drive shaft disposed on the frame with its axis close to that of the intermittent mechanism, means for driving said drive shaft, a clutch device disposed intermediate the drive shaft, means for locking the clutch device in open or closed position, means for permitting the clutch to be locked in closed position even when the clutch faces do not entirely engage for transmission of power, and means to snap the faces into power engagement as soon as a power relation therebetween is established.

6. In a driving mechanism for motion picture projectors having a support and a head frame supported therein around the axis of the intermittent mechanism, a drive shaft disposed on one side of the frame with its axis close to that of the intermittent mechanism, a shutter shaft disposed with its axis at right angles to that of the main drive shaft and drivingly connected directly thereto, an intermittent mechanism connected directly by a gear to the shutter shaft, and means for framing the intermittent sprocket while the shutter is running, the axis of the sprocket coinciding with the axis of the support of the entire machine.

7. In a driving mechanism for motion picture projectors having a support and a head frame pivotally supported therein around the axis of the intermittent mechanism, a drive shaft disposed vertically on one side of the frame, shafts for the upper magazine, the upper and lower sprockets, the lower magazine, and the shutter disposed close to the drive shaft, and gears on these shafts connecting directly with gears on the drive shaft.

8. In a driving mechanism for motion picture projectors having a support and a head frame pivotally supported therein around the axis of the intermittent mechanism, a drive shaft disposed vertically on one side of the frame, shafts for the lower magazine and upper and lower sprockets, and the shutter which are disposed close to the drive shaft, and gears on these shafts connecting directly with gears on the drive shaft, the shutter shaft being disposed at right angles to the drive shaft.

9. In a driving mechanism for motion picture projectors having a support and a head frame pivotally supported therein around the axis of the intermittent mechanism, a drive shaft disposed vertically on one side of the frame, shafts for the lower magazine, and upper and lower sprockets and the shutter disposed close to the drive shaft, and gears on these shafts connecting directly with gears on the drive shaft, the other shafts being disposed at right angles to both the shutter and the drive shafts.

10. In a driving mechanism for motion picture projectors having a support and a head frame pivotally supported therein around the axis of the intermittent mechanism, a drive shaft disposed vertically on one side of the frame, shafts for the upper and lower sprockets and the shutter disposed close to the drive shaft, and gears on these shafts connecting directly with gears on the drive shaft, the shutter being disposed at right angles to the drive shaft, the other shafts being disposed at right angles to both the shutter and drive shafts, and a clutch mechanism disposed on the drive shaft between the main drive gear, the lower magazine gear and the remainder of the above elements.

11. In a driving mechanism for motion picture projectors having a support and a head frame pivotally supported therein around the axis of the intermittent mechanism, a drive shaft disposed vertically on one side of the frame, a shutter shaft disposed at right angles to the drive shaft, these shafts disposed close to the axis of the intermittent sprocket, a gear on the shutter shaft, a gear on the pin wheel shaft of the intermittent mechanism, said gears being in direct mesh.

12. In a driving mechanism for motion picture projectors having a support and a head frame pivotally mounted therein around the axis of the intermittent mechanism, a drive shaft disposed vertically on one side of the frame, a shutter shaft disposed at right angles to the main drive shaft, these shafts disposed close to the axis of the intermittent sprocket, a gear on the shutter shaft, a gear on the pin wheel shaft of the intermittent mechanism, said gears being directly in mesh, and means for moving the intermittent sprocket to frame the film without disturbing the action and time relations of the shutter.

13. In a driving mechanism for motion picture projectors having a support and a head frame pivotally supported therein around the axis of the intermittent mechanism, a drive shaft vertically disposed on the frame with its axis close to that of the intermittent mechanism, means for driving said drive shaft, a clutch device disposed intermediate the drive shaft, a main drive gear and a lower magazine drive gear disposed on one side of the clutch device, and an upper magazine drive gear, lower and upper sprocket drive gears, and a shutter drive gear disposed on the other side of the clutch device on said main drive shaft.

14. In a driving mechanism for motion picture projectors having a support and a head frame pivotally supported therein around the axis of the intermittent sprocket, a drive shaft vertically disposed on the frame with its axis close to that of the intermittent mechanism, means for driving said drive shaft, a clutch device disposed intermediate the drive shaft, means for locking the clutch device in open or closed position, means for permitting the clutch to be locked in closed position even when the clutch faces do not entirely mesh, and means for snapping the faces into mesh as soon as relative movement therebetween takes place.

15. In a driving mechanism for motion picture projectors having a support and a head frame pivotally supported therein around the axis of the intermittent mechanism, a drive shaft vertically disposed on one side of the frame with its axis close to that of the intermittent mechanism, a shutter shaft disposed with its axis at right angles to that of the main drive shaft, and connected directly thereto, an intermittent mechanism connected directly by a gear to the shutter, and means for framing the intermittent sprocket while the shutter is running the axis of the sprocket coinciding with the axis of support of the entire machine.

16. In a motion picture projector, a support having a journal therein, a head frame having a bearing portion projecting therefrom and adapted to be disposed in said journal, and an intermittent casing disposed in said bearing, the axes of the bearing, the journal, and the intermittent casing being aligned with each other, said frame being rotatable on said bearing in said journal.

AUGUSTO DINA.